United States Patent

Tesch et al.

[11] Patent Number: 4,665,150
[45] Date of Patent: May 12, 1987

[54] EPOXY RESIN MIXTURES

[75] Inventors: Helmut Tesch, Birkenheide; Michael Portugall, Wachenheim; Herbert Stutz, Karlsruhe; Gerhard Heinz, Weisenheim, all of Fed. Rep. of Germany

[73] Assignee: BASF Aktiengesellschaft, Fed. Rep. of Germany

[21] Appl. No.: 852,555

[22] Filed: Apr. 16, 1986

[30] Foreign Application Priority Data

Apr. 20, 1985 [DE] Fed. Rep. of Germany ....... 3514347

[51] Int. Cl.$^4$ ............................................. C08G 59/02
[52] U.S. Cl. ...................................... 528/98; 525/504; 528/99; 528/100
[58] Field of Search ........................... 528/98, 99, 100; 525/504

[56] References Cited

U.S. PATENT DOCUMENTS 4,405,766  9/1983  Bertram et al. ................... 528/99 X
4,448,948  5/1984  Tsubaki et al. ................... 528/98 X
4,496,709  1/1985  Doorakian et al. ............... 528/99 X Primary Examiner—Earl Nielsen
Attorney, Agent, or Firm—Keil & Weinkauf

[57] ABSTRACT

A curable epoxy resin mixture containing an adduct of an epoxy resin with a bifunctional phenol or a bifunctional aromatic carboxylic acid of the formula

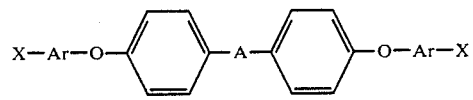

where A=SO$_2$ or CO, Ar is

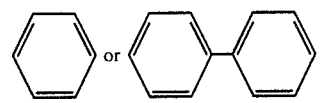

and X is OH or COOH, and an aromatic amine as a curing agent.

1 Claim, No Drawings

EPOXY RESIN MIXTURES

The present invention relates to epoxy resin mixtures which, when cured, give molded materials which can be used at high temperatures and possess good toughness.

Heat-curable mixtures of epoxy resins and aromatic amines are known. The corresponding cured molded materials can be used at high temperatures but are too brittle for many purposes at room temperature.

There are several known methods of improving the impact strength and elongation at break of materials of this type by means of suitable additives. In most cases, however, such additives result in a sharp decrease in the heat distortion resistance and rigidity of the cured molded materials.

It is an object of the present invention to improve the toughness properties of epoxy resins cured with aromatic amines, without producing a sharp decrease in the heat distortion resistance and rigidity.

We have found that this object is achieved by epoxy resin mixtures containing
(a) an adduct of
   (a1) an epoxy resin and
   (a2) a bifunctional phenol or a bifunctional aromatic carboxylic acid of the formula

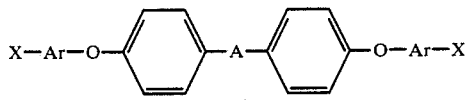

where A is $SO_2$ or CO,
Ar is

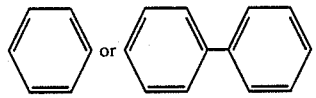

and X is OH or COOH,
the ratio of (a1) to (a2) being chosen so that there are from 1.5 to 50 epoxide groups per aromatic hydroxyl or carboxyl group, and
(b) an aromatic amine as a curing agent.

Suitable epoxy resins are low molecular weight and high molecular weight compounds possessing terminal epoxide groups, epoxide side groups or epoxide groups incorporated in cyclic systems. They may be liquid, semi-solid or solid. Compounds which contain more than one epoxide group per molecule are preferred.

Preferred epoxy resins are reaction products of polyfunctional alcohols, phenols, cycloaliphatic carboxylic acids, aromatic amines or aminophenols with epichlorohydrin, and cycloaliphatic epoxides and cycloaliphatic epoxide-esters. Mixtures of different epoxy resins may also be used. Bisphenol A diglycidyl ether, tetraglycidyldiaminodiphenylmethane and epoxidized novolaks are particularly preferred. The resins may contain the conventional diluents, such as phenyl glycidyl ether or butyl glycidyl ether.

According to the invention, the epoxy resin is converted to an adduct with a bifunctional phenol or carboxylic acid, these compounds having a chain-extending function. A preferred chain extender is the bisphenol of the formula

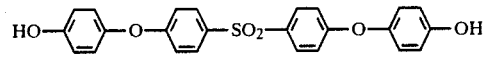

To prepare the adduct, a mixture of the epoxy resin and the chain extender is heated in the presence of a suitable catalyst, such as a tertiary amine or phosphine or a quaternary ammonium or phosphonium compound, in the presence or absence of an inert solvent, at about 100°–160° C. until the reaction is complete. This can be determined, for example, by monitoring the epoxide content, phenol content or carboxylic acid content of the mixture. The ratio of epoxy resin to chain extender should be chosen so that there are from 1.5 to 50, preferably from 2 to 20, epoxide groups per aromatic hydroxyl or carboxyl group. This gives a mixture of the adduct possessing terminal epoxide groups with excess epoxy resin.

Preferably used curing agents are aromatic diamines, eg. 4,4'-diaminodiphenylmethane, diaminodiphenyl sulfone or diaminodiphenyl ketone. Suitable amines and epoxy resins are described in detail in British Pat. No. 1,017,699.

The epoxy resin mixtures are prepared in general by dissolving the solid curing agent in a melt of the adduct and the epoxy resin. If necessary, a solvent may be present, this being removed subsequently by distillation.

The ratio of the epoxide component to the amine curing agent is chosen so that there are about 0.5–2.4 reactive amine hydrogen atoms per epoxide group, a ratio of from 0.9:1 to 1.1:1 being preferred.

It is also possible to add to the curable mixtures conventional curing catalysts, such as boron trifluoride monoethylamine or salicylic acid, in an amount of about 0.01–5 parts by weight per 100 parts of epoxy resin component. The mixtures may furthermore contain conventional additives, such as pigments, fillers, reinforcing fibers, flameproofing agents and non-volatile extenders.

The curable mixtures can be used for coatings, as adhesives and as binders for fiber-reinforced materials.

Fiber-reinforced materials are prepared via the prepreg stage. This technique is familiar to the skilled worker. We have found that, because of the increased melt viscosity, the novel compositions have better flow behavior than conventional mixtures of epoxy resins and aromatic amines. The mixtures can be used to prepare prepregs exhibiting controlled flow behavior.

The mixtures are cured at from about 140° to about 250° C., preferably from 160° to 220° C., for about 2–20 hours.

EXAMPLE 100 parts by weight of bisphenol A diglycidyl ether (Epikote ® 828 from Shell, epoxide content 0.53 mole/100 g) are mixed with 35 parts by weight of

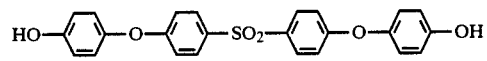

at 150° C. After a few minutes, a homogeneous solution has formed. 0.05 part by weight of triphenylphosphine is added, and the mixture is stirred at 150° C. for 100 minutes. The epoxide content of the adduct is then 0.28 mole/100 g.

24 parts by weight of 4,4'-diaminodiphenyl sulfone (Araldit ® HT 976 from Ciba Geigy) are added to the mixture at 150° C. Stirring is carried out for 10 minutes, after which the curing agent is found to have dissolved completely. The homogeneous mixture is degassed for a few minutes under 30 mbar in order to remove the air. The mixture is then poured into a steel sheet mold and cured first for 3 hours at 150° C. and then for 12 hours at 180° C. The following properties are measured on the cured specimens at 23° C.:

Impact strength (DIN 53,453): 82 kj/m$^2$
Elongation at break (DIN 53,455): 8.2%
Tensile strength (DIN 53,455): 84 N/mm$^2$
Tensile modulus of elasticity (DIN 53,457): 2,830 N/mm$^2$ The glass transition temperature is 170° C. (DIN 53,445).

COMPARATIVE EXAMPLE (without adduct formation)

100 parts by weight of Epikote 828 are mixed with 33 parts by weight of Araldit HT 976 at 150° C. The curing agent is found to have dissolved completely after a few minutes. The mixture is degassed, and curing is carried out by a method similar to that used for the novel mixture.

Properties:
Impact strength: 28 kj/m$^2$
Elongation at break: 4.8%
Tensile strength: 71 N/mm$^2$
Tensile modulus of elasticity: 3,140 N/mm$^2$
Glass transition temperature: 210° C.

We claim:
1. A curable epoxy resin mixture containing
(a) an adduct of
   (a1) an epoxy resin and
   (a2) a bifunctional phenol or a bifunctional aromatic carboxylic acid of the formula

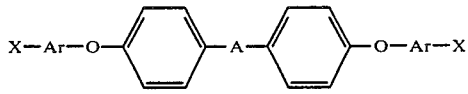

where A is SO$_2$ or CO,
Ar is

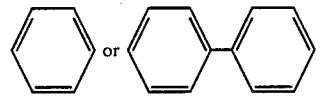

and X is OH or COOH,
the ratio of (a1) to (a2) being chosen so that there are fom 1.5 to 50 epoxide groups per aromatic hydroxyl or carboxyl group, and
(b) an aromatic amine as a curing agent.

* * * * *